United States Patent [19]

Esmay

[11] Patent Number: 4,599,265
[45] Date of Patent: * Jul. 8, 1986

[54] REMOVABLE PRESSURE-SENSITIVE ADHESIVE TAPE

[75] Inventor: Donald L. Esmay, Coon Rapids, Minn.

[73] Assignee: Minnesota Mining and Manufacturing Company, Saint Paul, Minn.

[ * ] Notice: The portion of the term of this patent subsequent to Jun. 11, 2002 has been disclaimed.

[21] Appl. No.: 701,442

[22] Filed: Feb. 13, 1985

Related U.S. Application Data

[63] Continuation of Ser. No. 439,047, Nov. 4, 1982, Pat. No. 4,522,870.

[51] Int. Cl.$^4$ ............................................. C09J 7/02
[52] U.S. Cl. ...................... 428/355; 428/343; 428/344; 428/345; 428/354; 428/356; 428/520; 428/522; 428/906
[58] Field of Search ............... 428/343, 344, 345, 354, 428/355, 356, 352, 520, 522

[56] References Cited

U.S. PATENT DOCUMENTS 4,364,972 12/1982 Moon ................................. 428/345

*Primary Examiner*—Edith Buffalow
*Attorney, Agent, or Firm*—D. M. Sell; J. A. Smith; C. Truesdale

[57] ABSTRACT

A roll of pressure-sensitive adhesive tape, the adhesive layer of which is an alkyl acrylate polymer which is low-tack and yet sufficiently tacky to adhere reliably to ordinary substrates but, by virtue of being crosslinked and nearly free from polar substituents, it is readily peelable from those substrates after prolonged dwell.

12 Claims, No Drawings

REMOVABLE PRESSURE-SENSITIVE ADHESIVE TAPE

This is a continuation application Ser. No. 439,047 filed Nov. 4, 1982, now U.S. Pat. No. 4,522,870.

FIELD OF THE INVENTION

The invention concerns pressure-sensitive adhesive tape which has low-tack and is capable of being peeled off substrates to which it may be applied.

BACKGROUND ART

The adhesive bond between a pressure-sensitive adhesive tape and a substrate to which it has been applied tends to become gradually stronger so that after some hours, days or months, the tape can no longer be removed without delaminating either the tape or the substrate. Accordingly, peelable tapes such as masking tapes usually have very low initial adhesiveness and should be removed as soon as possible before any appreciable buildup in adhesion. Because of their low adhesiveness, such tapes often accidentally fall off.

It is believed that the highest quality pressure-sensitive adhesive tapes now on the market are those of U.S. Pat. No. Re 24,906 (Ulrich). Their adhesives are copolymers of about 88 to 97 parts of acrylic acid ester of non-tertiary alcohol, the alkyl groups of which have an average of 4–12 carbon atoms, and correspondingly about 12 to 3 parts by weight of at least one strongly polar copolymerizable monomer such as acrylic acid. Those adhesives experience no observable deterioration even after years in hot climates, but experience the adhesion buildup mentioned above, as is pointed out in U.S. Pat. No. 3,008,850 (Ulrich). That later Ulrich patent suggests that less buildup would occur if the modifying copolymerizable monomer were acrylonitrile or methacrylonitrile which are somewhat less polar. Even so, tapes of 3,008,850 experience gradually increasing adhesion to substrates, and there is no assurance that a tape which provides adequate initial adhesion will be removable without delamination after some months at ordinary room temperatures.

Recent patents disclose that pressure-sensitive adhesive tapes like those of the Ulrich patents can be made by photopolymerizing the same monomers in contact with a carrier web. See U.S. Pat. Nos. 4,181,752 (Martens et al.); 4,303,485 (Levens); 4,329,384 (Vesley et al.); and 4,330,590 (Vesley). All of the tapes of the working examples of those patents experience the same sort of adhesion buildup as do tapes of the Ulrich patents.

DISCLOSURE OF INVENTION

The pressure-sensitive adhesive tape of the invention reliably adheres to most clean substrates until being deliberately pulled off, yet experiences almost no adhesion buildup after months in contact with a substrate, even if exposed to moderately elevated temperatures. The tape then can be cleanly peeled from the substrate without either delaminating the substrate or leaving any adhesive residue. Like the pressure-sensitive adhesive tape of the aforementioned Martens patent, the novel tape comprises a flexible carrier web and a pressure-sensitive adhesive layer comprising a polymer of one or more monomers which are predominantly alkyl acrylate, the alkyl groups of which have an average of 4–12 carbon atoms. The novel tape differs from the Martens tapes in that said one or more monomers are nearly free from any polar copolymerizable monomer. More specifically, up to 3 mol percent of said monomers may be one or more strongly polar copolymerizable monomers such as acrylic acid, itaconic acid, hydroxyalkyl acrylates, cyanoalkyl acrylates or acrylamide, and up to 15 mol percent may be one or more moderately polar copolymerizable monomers such as acrylonitrile, N-vinyl-2-pyrrolidone, vinyl chloride, vinylidene chloride, vinyl toluene, styrene, or diallyl phthalate. The polymerizable composition may further include nonpolar or slightly polar copolymerizable monomers such as butadiene or isoprene in amounts exceeding 15 mol percent as long as such monomers do not interfere with the properties of the polymer.

The adhesive layer of the novel tape is crosslinked before being used to provide a 180° peelback value from a glass plate within the range of 5 to 30 N/dm (preferably 10 to 20 N/dm) immediately after being applied, which value does not increase more than 20% after 30 days dwell at 22° C. An immediate 180° peelback value from glass within that range is rather low for a pressure-sensitive adhesive layer and may be characterized as "low-tack", but is high enough to assure reliable adhesion to ordinary paper, metal, glass, plastic, and painted substrates. Because its 180° peelback value increases no more than 20% from that low-tack after 30 days dwell at 22° C., the novel tape can be peeled cleanly from such substrates after prolonged dwell. Accordingly the novel tape is especially useful as a masking tape and for such purposes as the mounting of posters, bulletins, and temporary labels. When intended for mounting uses, the carrier web of the novel tape may be a plastic film, a paper tissue or a nonwoven scrim having pressure-sensitive adhesive layers on both faces. The double-coated tape may be readily and cleanly removed both from the object being mounted and from the substrate to which the object is mounted.

The adhesive surfaces of two pieces of the novel tape can easily be peeled apart, even after remaining in contact with each other for several months and even if exposed to moderately elevated temperatures. By virtue of this characteristic, a double-coated tape of the invention can be wound directly upon itself for storage and shipment without any need for a disposable liner.

Crosslinking to provide the desired 180° peelback value from glass is especially easy to control by photopolymerizing the monomers in admixture with a photocrosslinker as in Example 27 of Martens 4,181,752. Useful photocrosslinkers include the 2,4-bis(trichloromethyl)-6-p-methoxystyryl-s-triazine of that example and any of the chromophore-substituted-halomethyl-s-triazines of Vesley U.S. Pat. Nos. 4,329,384 and 4,330,590. Other useful photocrosslinkers are polyacrylic-functional monomers such as trimethylolpropane triacrylate; pentaerythritol tetraacrylate; 1,2-ethylene glycol diacrylate; 1,6-hexanediol diacrylate; and 1,12-dodecanediol diacrylate. Each of these photocrosslinkers is useful in the approximate range of 0.05 to 0.5 percent by weight of the polymerizable monomers or resulting polymer. The adhesive layer is usually sufficiently crosslinked when, on attempting to dissolve in heptane, the undissolved gel component exceeds 50%.

Since the viscosity of the polymerizable monomers tends to be quite low, the monomers may be partially polymerized to a viscosity in the range of about 1000 to 40,000 cps before being admixed with the crosslinker and coated onto the flexible carrier web. Viscosities within the range of 5,000 to 15,000 cps are preferred for ease of handling. Instead of being partially polymerized, the monomers can be mixed with a thixotropic agent such as fumed silica, followed by polymerizing and crosslinking in a single in situ step after coating.

In the current state of the art, photopolymerization of thin coatings is carried out in an inert atmosphere. A sufficiently inert atmosphere can be achieved by covering a layer of the photoactive coating with a plastic film which is transparent to ultraviolet radiation, and irradiating through that film in air. If instead of covering the polymerizable coating the photopolymerization is to be carried out in an inert atmosphere, the permissible oxygen content of the inert atmosphere can be increased by mixing into the polymerizable composition an oxidizable tin compound as taught in U.S. Pat. No. 4,303,485 (Levens), which also teaches that by doing so, thick coatings can be polymerized in air. If the monomers are partially polymerized and the polymerization is to be completed in situ by heat, it is usually necessary to add additional heat-activatable polymerization initiator to the partially polymerized composition.

In situ polymerization can also be effected by electron beam as suggested in U.S. Pat. No. 4,234,500 (Glennon). See also U.S. Pat. No. 2,956,904 (Hendricks).

Instead of in situ polymerization, the crosslinker can be added to a solution of a polymer which is then coated onto the carrier web. If the crosslinker is an organic peroxide as in U.S. Pat. No. 2,973,286 (Ulrich), the heat applied to dry the coating should provide sufficient crosslinking.

Other materials which can be blended with the polymerizable mixtures include tackifiers, reinforcing agents, fire retardants, and other modifiers, some of which may copolymerize with the alkyl acrylate monomer or photopolymerize independently.

Glass microbubbles having an average diameter of 10 to 200 micrometers can be blended with photopolymerizable mixtures as taught in U.S. Pat. No. 4,223,067 (Levens). If the microbubbles comprise 20 to 65 volume percent of the pressure-sensitive adhesive, the polymerized product will have a foam-like appearance and be suitable for uses to which foam-backed pressure-sensitive adhesive tapes are put.

180° Peelback Value

Tape is adhered by its adhesive to a test plate under the weight of a 4.5 kg hard rubber roller, 2 passes in each direction. The free end of the tape is attached to a scale, and the test plate is moved away from the scale at a rate of about 0.38 cm per second and at an angle of 180°.

In the following examples, all parts are given by weight.

EXAMPLE 1

To 100 parts of isooctyl acrylate was added 0.04 part of 2,2-dimethoxy-2-phenyl acetophenone photoinitiator (obtainable as "Irgacure" 651). This was partially polymerized by exposure to ultraviolet radiation to provide a syrup about 3000 cps in viscosity. After adding 0.2 part of hexanediol diacrylate crosslinker and an additional 0.1 part of the photoinitiator the syrup was poured onto a first biaxially-oriented polyethylene terephalate film and covered by a second such film at a knife which was adjusted to squeeze the syrup to provide a uniform coating of about 0.05 mm thickness. The facing surfaces of the first and second films respectively had ultrathin adhesion-promoting and low-adhesion coatings.

The composite emerging from the knife was exposed to a bank of fluorescent black light bulbs (Sylvania F20T12BL), 90% of the emissions of which were between 300 and 400 nm with a maximum at 351 nm. The composite received 500 mj of energy as measured by an International Light "Light Bug" which is spectrally responsive between 250 and 430 nm, maximum 350 nm.

After stripping off the second film, the resulting pressure-sensitive adhesive tape was wound upon itself in roll form.

EXAMPLES 2–8

A number of tapes were prepared in the same way as in Example 1 except that some of the tapes employed n-butyl acrylate (BA) instead of isooctyl acrylate (IOA) and some employed other crosslinkers instead of hexanediol diacrylate (HDDA) namely,

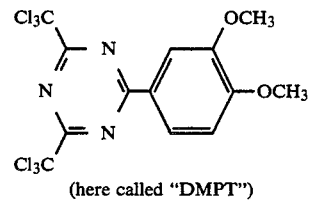

(here called "DMPT")

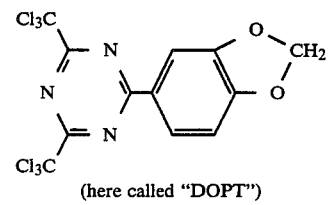

(here called "DOPT")

Some of the initial monomer mixtures included stannous octoate ("SnOct") as reported below (the amounts of crosslinker and stannous octoate being indicated in parts per 100 parts monomer):

| Example | Alkyl Acrylate | Crosslinker | SnOct |
|---------|----------------|-------------|-------|
| 1 | IOA | HDDA 0.2 | 0 |
| 2 | IOA | HDDA 0.2 | 0.5 |
| 3 | IOA | DMPT 0.12 | 0 |
| 4 | IOA | DOPT 0.16 | 0.5 |
| 5 | BA | HDDA 0.1 | 0.5 |
| 6 | 50 IOA 50 BA | HDDA 0.1 | 0.5 |
| 7 | 99 IOA 1 AA | HDDA 0.15 | 0.5 |
| 8 | 98 IOA 2 NVP | HDDA 0.15 | 0.5 |

AA = acrylic acid
NVP = N—vinyl-2-pyrrolidone

The tapes of Examples 1–8 were tested for immediate 180° peelback from various surfaces with the following results:

| | 180° Peelback (N/dm) from | | |
|---------|-------|---------------|-----------------|
| Example | Glass | Polypropylene | Stainless Steel |
| 1 | 11 | 15 | 14 |
| 2 | 10 | 7 | NT |
| 3 | 13 | 18 | 18 |

-continued

| Example | 180° Peelback (N/dm) from | | |
|---|---|---|---|
| | Glass | Polypropylene | Stainless Steel |
| 4 | 14 | 13 | NT |
| 5 | 10 | 7 | NT |
| 6 | 12 | 12 | NT |
| 7 | 13 | NT | NT |
| 8 | 14 | NT | NT |

NT = not tested

Strips of the tapes of each of Examples 1–8 were adhered by their adhesive layers to writing paper and to a painted automotive metal test panel. After six months at ordinary room temperatures, each of the strips was easily peeled away without leaving any adhesive residue.

Other strips of the tapes of Examples 1 and 2 were adhered by their adhesive layers to writing paper which was then placed in an oven at 70° C. for three days. After cooling to room temperature, each tape was cleanly peeled off without delaminating the paper or leaving any adhesive residue on the paper.

COMPARISON TESTS

Tapes were made as in Examples 1 and 5 except omitting the crosslinker. When strips of these tapes remained adhered to the same writing paper and painted metal panel for three weeks at ordinary room temperature, neither strip could be cleanly peeled off from the substrate.

Another tape was made as in Example 1 except replacing 10 percent of the IOA with acrylic acid and reducing the amount of HDDA to 0.15 part. After three weeks at ordinary room temperature in contact with the same writing paper and painted metal panel, strips of this tape could not be cleanly peeled off either substrate.

EXAMPLE 9

A mixture of 96 parts of isooctylacrylate, 4 parts of acrylic acid, and 0.04 part of photoinitiator ("Irgacure" 651) was partially polymerized by exposure to ultraviolet radiation to provide a syrup of coatable viscosity. After mixing 0.14 part of hexanediol diacrylate and an additional 0.1 part of the photoinitiator into the syrup, it was poured onto the low-adhesion surface of a first disposable plastic film. A film of unprimed unplasticized, unpigmented polyvinyl chloride of 0.1 mm thickness was laid onto the syrup to provide a composite which was drawn beneath a first knife to squeeze the syrup to a uniform thickness of about 0.05 mm. A second syrup identical to that used in Example 1 was poured onto the exposed face of the vinyl film, and to this was joined, at a second knife, the low-adhesion surface of a second disposable plastic film. The spacing beneath the second knife was adjusted to squeeze the second syrup to a uniform thickness of about 0.05 mm.

The full composite was then passed between two banks of ultraviolet lamps, each bank identical to that used in Example 1 and providing an exposure to 500 mj of energy from each bank of lamps. This polymerized each of the syrups to a pressure-sensitive adhesive state, thus creating a double-coated pressure-sensitive adhesive tape having a central flexible carrier web. The adhesive layer from the first syrup was ordinary agressively pressure-sensitive adhesive layer capable of forming strong bonds which would experience gradual adhesion buildup typical of pressure-sensitive adhesives of the prior art. The adhesive layer from the second syrup had the same long-term removability of the tape of Example 1 (i.e., 180° peelback value from glass of 11 N/dm).

Both disposable plastic films were removed from another strip of the double-coated tape of this example, and the strip was wound upon itself on a 7.6 cm core. Even though it had no liner, the strip could be unwound without any delamination or transfer of adhesive from one face to the other, even after being stored for six months at ordinary room temperatures.

EXAMPLE 10

A double-coated tape was made as in Example 9 except that the first adhesive layer was a copolymer of 90 parts of isooctyl acrylate and 10 parts of acrylic acid, the crosslinker was replaced by 0.15 part of the DMPT crosslinker, and the polymerizable mixture included 35 parts of pentabromodiphenyl oxide as a flame retardant. Also, the photopolymerizable mixture for the second adhesive layer included 35 parts of that flame retardant. The first adhesive layer of the resulting tape was an ordinary agressively pressure-sensitive adhesive layer, and the second adhesive layer had low-tack and was cleanly peelable from ordinary substrates after prolonged dwell.

After removing the first disposable plastic film, the exposed adhesive layer was applied to the backside of a vinyl sheet intended for aircraft carpet use. Within a short time the tape became securely bonded to the vinyl sheet. After then removing the second disposable plastic film, the exposed adhesive layer was applied to an aircraft floor panel which had a covering of polyvinylidene fluoride film. Tests showed that this held the vinyl sheet securely in place against the sort of stresses experienced by an aircraft carpet in use and that the vinyl sheet with its double-coated tape could be repeatedly removed for such purposes as changing the cabin between passenger and freight configurations.

EXAMPLE 11

A double-coated tape was made as in Example 9 except that the central carrier web was biaxially-oriented polyethylene terephthalate film and both adhesive layers were identical to that of the Example 1 tape. The polyethylene terephthalate film had a thickness of 0.05 mm, and one of its faces had an adhesion-promoting coating while its other face was untreated. This double-coated tape was wound upon itself into roll form without a liner. After six months at ordinary room temperatures, it could be unwound easily without any delamination or adhesive transfer and could be put to uses requiring both assured immediate adhesion and easy removability after being in place for prolonged periods of time.

EXAMPLE 12

A double-coated tape was made as in Example 9 except that one of its adhesive layers was a copolymer of 99.2 parts of isooctyl acrylate and 0.8 parts of acrylic acid, and the hexanediol diacrylate crosslinker was employed in amounts of 0.32 part in the copolymer layer and 0.22 part in the homopolymer layer. The tape was wound upon itself on a 1.9 cm core and placed in an oven at 70° C. for three days. After cooling to room temperature, it was unwound easily without any adhesive transfer.

I claim:

1. Pressure-sensitive adhesive tape comprising a flexible carrier web and a pressure-sensitive adhesive layer comprising a polymer of one or more monomers which are predominantly alkyl acrylate, the alkyl groups of which have an average of 8–12 carbon atoms, and are nearly free from any polar copolymerizable monomer, wherein up to 3 mol percent of said polar copolymerizable monomers comprise strongly polar copolymerizable monomer and up to 15 mol percent of said polar copolymerizable monomers comprise moderately polar copolymerizable monomer, said adhesive layer being crosslinked to provide a 180° peelback value from glass within the range of 5 to 30 N/dm immediately after being applied, which value does not increase more than 20% after 30 days dwell at 22° C., thus assuring both reliable adhesion and clean peelability after prolonged dwell.

2. Pressure-sensitive adhesive tape as defined in claim 1 wherein the strongly polar copolymerizable monomer is acrylic acid.

3. Pressure-sensitive adhesive tape as defined in claim 2 wherein the moderately polar copolymerizable monomer was acrylonitrile or N-vinyl-2-pyrrolidone.

4. Pressure-sensitive adhesive tape as defined in claim 1 having a second pressure-sensitive adhesive layer as defined in claim 1 on the other face of the carrier web.

5. Pressure-sensitive adhesive tape as defined in claim 4 wherein the two pressure-sensitive adhesive layers are identical.

6. Pressure-sensitive adhesive tape as defined in claim 4 which is wound upon itself in roll form and can be unwound after prolonged storage without any delamination or transfer of adhesive.

7. Pressure-sensitive adhesive tape as defined in claim 1 having an ordinary aggressively pressure-sensitive adhesive layer on the other face of the carrier web.

8. Pressure-sensitive adhesive tape as defined in claim 7 which is wound upon itself in roll form and can be unwound after prolonged storage without any delamination or transfer of adhesive.

9. Pressure-sensitive adhesive tape as defined in claim 1 having a 180° peelback value from glass within the range of 10 to 20 N/dm immediately after being applied.

10. A roll of pressure-sensitive adhesive tape as defined in claim 1.

11. Pressure-sensitive adhesive tape as defined in claim 1 wherein said alkyl group of said alkyl acrylate has 8 carbon atoms.

12. Pressure-sensitive adhesive tape comprising a flexible carrier web and a pressure-sensitive adhesive layer comprising a polymer of one or more monomers which are predominantly isooctyl acrylate, and are nearly free from any polar copolymerizable monomer, said adhesive layer being crosslinked to provide a 180° peelback value from glass within the range of 5 to 30 N/dm immediately after being applied, which value does not increase more than 20% after 30 days dwell at 22° C., thus assuring both reliable adhesion and clean peelability after prolonged dwell.

* * * * *

UNITED STATES PATENT AND TRADEMARK OFFICE
CERTIFICATE OF CORRECTION

PATENT NO. : 4,599,265

DATED : July 8, 1986

INVENTOR(S) : DONALD L. ESMAY

It is certified that error appears in the above-identified patent and that said Letters Patent is hereby corrected as shown below:

Col. 3, line 52, "0.38" should read -- 3.8 -- .

Signed and Sealed this

Seventh Day of October, 1986

[SEAL]

*Attest:*

DONALD J. QUIGG

*Attesting Officer*      *Commissioner of Patents and Trademarks*

UNITED STATES PATENT AND TRADEMARK OFFICE
CERTIFICATE OF CORRECTION

PATENT NO. : 4,599,265

DATED : July 8, 1986

INVENTOR(S) : DONALD L. ESMAY

It is certified that error appears in the above-identified patent and that said Letters Patent is hereby corrected as shown below:

Col. 7, line 24 (claim 3, line 2), delete "2" and insert --1--.

Signed and Sealed this

Twenty-third Day of October, 1990

Attest:

HARRY F. MANBECK, JR.

Attesting Officer     Commissioner of Patents and Trademarks